US012209230B2

(12) United States Patent
Dubs et al.

(10) Patent No.: US 12,209,230 B2
(45) Date of Patent: Jan. 28, 2025

(54) 3D PRINTED PARTS MADE BY ADDITIVE MANUFACTURING USING POST PROCESSING CLEANERS

(71) Applicant: Henkel AG & Co. KGaA, Duesseldorf (DE)

(72) Inventors: Ronald F. Dubs, Madison Heights, MI (US); Christopher C. Coleman, Dearborn, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 862 days.

(21) Appl. No.: 17/215,204

(22) Filed: Mar. 29, 2021

(65) Prior Publication Data

US 2021/0214652 A1 Jul. 15, 2021

Related U.S. Application Data

(63) Continuation of application No. PCT/US2019/053700, filed on Sep. 28, 2019.

(60) Provisional application No. 62/738,103, filed on Sep. 28, 2018.

(51) Int. Cl.
| | |
|---|---|
| *C11D 1/72* | (2006.01) |
| *B29C 64/35* | (2017.01) |
| *B33Y 30/00* | (2015.01) |
| *C11D 1/06* | (2006.01) |
| *C11D 1/12* | (2006.01) |
| *C11D 1/722* | (2006.01) |
| *C11D 3/00* | (2006.01) |
| *C11D 3/20* | (2006.01) |
| *B33Y 70/00* | (2020.01) |

(52) U.S. Cl.
CPC ............ *C11D 3/2068* (2013.01); *B29C 64/35* (2017.08); *B33Y 30/00* (2014.12); *C11D 1/06* (2013.01); *C11D 1/123* (2013.01); *C11D 3/0063* (2013.01); *C11D 3/0084* (2013.01); *C11D 3/2093* (2013.01); *B33Y 70/00* (2014.12)

(58) Field of Classification Search
CPC ........... C11D 1/123; C11D 1/72; C11D 1/722; C11D 3/0063; C11D 3/0084; C11D 3/2041; C11D 3/2068
See application file for complete search history.

(56) References Cited

U.S. PATENT DOCUMENTS

| | | | |
|---|---|---|---|
| 6,001,793 A | 12/1999 | Figdore et al. | |
| 6,274,296 B1 * | 8/2001 | Chu | ........................ G03F 7/425 |
| | | | 430/423 |
| 6,506,717 B1 * | 1/2003 | Kott | ........................ C11D 11/04 |
| | | | 510/357 |
| 2002/0013239 A1 | 1/2002 | Sahbari | |

(Continued)

FOREIGN PATENT DOCUMENTS

| | | |
|---|---|---|
| CN | 105856571 | 8/2016 |
| CN | 106945270 | 7/2017 |

(Continued)

OTHER PUBLICATIONS

International Search Report for International application No. PCTUS2019/053700 dated Feb. 4, 2020.

*Primary Examiner* — Brian P Mruk
(74) *Attorney, Agent, or Firm* — Mary K. Cameron (57) ABSTRACT

Provided herein are methods for making 3D printed parts by additive manufacturing using post processing cleaners.

32 Claims, 4 Drawing Sheets

BRIGHTFIELD, REFLECTED LIGHT PHOTOMICROGRAPHS
POST-CURE, 40X (56) References Cited

U.S. PATENT DOCUMENTS

| | | |
|---|---|---|
| 2004/0259753 A1 | 12/2004 | Wilson et al. |
| 2006/0142172 A1* | 6/2006 | Cioletti .................. C09K 8/524 |
| | | 510/365 |
| 2007/0010414 A1* | 1/2007 | Cioletti .................. C11D 1/667 |
| | | 42/95 |
| 2010/0041577 A1 | 2/2010 | Tippetts et al. |
| 2017/0029671 A1 | 2/2017 | Sawanobori et al. |
| 2017/0173872 A1 | 6/2017 | McCall et al. |

FOREIGN PATENT DOCUMENTS

| | | |
|---|---|---|
| KR | 1020140006661 | 1/2014 |
| KR | 1020160147839 | 12/2016 |
| WO | 9529980 | 11/1995 |
| WO | 2018079513 | 5/2018 |

* cited by examiner

BRIGHTFIELD, REFLECTED LIGHT PHOTOMICROGRAPHS
POST-CURE, 40X

FIG.1

POST-CURE, 40X

FIG.2

POST-CURE, 40X

FIG.3

POST-CURE, 40X

FIG.4

POST-CURE

3D PRINTED PARTS MADE BY ADDITIVE MANUFACTURING USING POST PROCESSING CLEANERS

This application is a continuation of PCT/US2019/053700, filed Sep. 28, 2019, which claims benefit to Provisional Ser. No. 62/738,103, filed Sep. 28, 2018.

BACKGROUND

Field

Provided herein are methods for making 3D printed parts by additive manufacturing using post processing cleaners.

Brief Description of Related Technology

Additive manufacturing is fast becoming a viable alternative to traditional manufacturing techniques and in some cases the only practical alternative for making complex parts.

One draw back to additive manufacturing is with photocurable resins. There the end user runs the risk of incomplete cure and part formation. Sometimes with incomplete cure residual photocuable resin can remain on the surface of the printed part. When that happens and the surface contains residual resin, surface imperfections may be observed, surface tackiness may be created and/or the quality of the surface finish in the intended function of the part may be compromised. Attempts have been made in the past to address the issue.

For instance, US Patent Application Publication No. US 2017/0173872 provides a method of forming a 3D object, comprising: (a) providing a carrier and a fill level, and optionally an optically transparent member having a build surface defining the fill level, the carrier and the fill level having a build region therebetween; (b) filling the build region with a polymerizable liquid, the polymerizable liquid comprising a mixture of (i) a light polymerizable liquid first component, and (ii) a second solidifiable component that is different from the first component; (c) irradiating the build region with light (through the optically transparent member when present), to form a solid polymer scaffold from the first component and also advancing the carrier away from the build surface to form a 3D intermediate having the same shape as, or a shape to be imparted to, the 3D object and containing the second solidifiable component carried in the scaffold in unsolidified and/or uncured form; (d) washing the 3D intermediate; and (e) concurrently with or subsequent to the irradiating step and/or the washing step, solidifying and/or curing the second solidifiable component in the 3D intermediate to form the 3D object. In one of the more focused and relevant sections of the '872 publication, the washing step according to the '872 publication uses "[a]ny suitable wash liquid" and lists BIO-SOLV™ solvent replacement; PURPLE POWER™ degreaser/cleaner; SIMPLE GREEN® all purpose cleaner; a 50:50 volume:volume mixture of water and isopropanol as possible choices.

To date none are believed to be without their own draw backs. For instance, many known wash liquids or cleaners are believed to comprise isopropanol and other solvents with low flash points and high volatile organic compounds.

In the past, a 3D printed part might have been washed after printing to remove deleterious matter collected on the surface of the 3D printed part or residual, uncured resin remaining on the surface of the 3D printed part. In so doing, the wash baths ordinarily would become rich in uncured resin, which over time begins to cure. The curing causes the wash bath to reach a gel consistency and unsuitable for its intended purpose. Thus, the bath requires changing, which is cumbersome, time consuming and costly. A bath with longer shelf life would be a tremendous advantage to the end user.

Thus, notwithstanding the state of the art it would be desirable to facilitate the facile washing of the 3D printed part and to do so in a manner that does not negatively impact the shelf life of the bath in which the 3D printed part is washed, while using a wash that is made with higher flash point components and has at least reduced VOC emissions.

SUMMARY

These desires are satisfied by the present invention.

Accordingly, through the use of the inventive composition and method, 3D printed parts may be produced more efficiently with a cleaner surface finish, substantially free of deleterious matter and/or with little to no unwanted resin left on the surface. This is no small matter because in the past either the end user was left with a compromised surface finish on the 3D printed part or had to take extra measures to prepare manually the surface finish (assuming that the entirety of the surface was accessible to the end user). Thus, it is seen that the inventive composition and method significantly contribute to the advancement of 3D printing into more prevalent use.

In one aspect, provided herein is a composition comprising: (a) One or more alkylene glycols; (b) One or more alkylene glycol ethers; (c) One or more alkoxylated aromatic alcohols; and (d) An antioxidant component.

In another aspect, provided herein is a method of washing a 3D printed part made by additive manufacturing. The method comprises the steps of:
  (a) Contacting with a composition as described above an additive manufacturing-made 3D printed part, the 3D printed part made from a photocurable resin composition, and having at least one surface; and
  (b) Permitting the 3D printed part to remain in contact with the composition for a time sufficient to remove substantially all of any photocurable resin composition remaining on the surface; and
  (c) Removing the 3D printed part in step (b) from contact with the composition, and optionally, contacting the 3D printed part with water and/or air for a time sufficient to remove substantially all of any composition and/or water, respectively, remaining on the 3D printed part.

DETAILED DESCRIPTION

As noted above, a method of washing a 3D printed part made by additive manufacturing is provided herein.

The method includes the steps of: (a) Contacting with a composition as described above an additive manufacturing-made 3D printed part, the 3D printed part made from a photocurable resin composition, and having at least one surface; and (b) Permitting the 3D printed part to remain in contact with the composition for a time sufficient to remove substantially all of any photocurable resin composition remaining on the surface; and (c) Removing the 3D printed part in step (b) from contact with the composition, and optionally, contacting the 3D printed part with water and/or air for a time sufficient to remove substantially all of any composition and/or water, respectively, remaining on the 3D printed part.

Additive manufacturing is performed to form the 3D printed part according to data indicating a pre-determined pattern.

The composition in one aspect includes: (a) One or more alkylene glycols; (b) One or more alkylene glycol ethers; (c) One or more alkoxylated aromatic alcohols; and (d) An antioxidant component. This composition is a more effective cleaner for washing the 3D printed part, for all of the reasons stated herein.

The composition may further include (e) a surfactant component.

The composition may further include (f) water.

The alkylene glycol(s) (a) should have from 1 to about 12 carbon atoms, examples of which include mono, di, tri and tetra ethylene or propylene glycols, butylene glycols, and hexylene glycols.

The alkylene glycol(s) (a) should be present in an amount of about 0 to about 90 percent by weight, such as about 50 to about 75 percent by weight.

The alkylene glycol ethers (b) may have from 2 to about 10 carbon atoms forming the ether, examples of which may be ethylene glycol C1-C6 alkyl ethers or propylene glycol C1-C6 alkyl ethers, such as ethylene glycol n-butyl ether, dipropylene glycol methyl ether or tripropylene glycol methyl ether.

The alkylene glycol ether(s) (b) should be present in an amount of about 10 to about 90 percent by weight, such as about 50 to about 75 percent by weight.

The alkoxylated aromatic alcohols (c) may be alkoxylated benzyl alcohols, such as methoxylated or ethoxylated benzyl alcohol.

The alkoxylated aromatic alcohol(s) should be present in an amount of about 1 to about 25 percent by weight, such as about 5 to about 20 percent by weight.

The antioxidant component (d) may be selected from 2,6-di-tert-butyl-4-methylphenol, 2,6-di-tert-butyl-4-methoxyphenol, C1-C12 gallic acid esters (such as propyl gallate), tert-butylhydroquinone, N,N-diethylhydroxylamine, ascorbic acid and its esters, and mixtures thereof.

The antioxidant component should be present in an amount of about 0.005 to about 0.5 percent by weight, such as about 0.01 to about 0.25 percent by weight.

The surfactant component should be selected from dialkyl sulfosuccinate salts; or C4-C18 linear or branched, saturated or unsaturated alcohol alkoxylates, where the alkoxylates may be selected from C4-C18 linear or branched, saturated or unsaturated alcohol ethoxylates, propoxylates, propoxylated-ethoxylates, ethoxylated-propoxylates and mixtures thereof.

The surfactant component should be present in an amount of about 0.1 to about 50 percent by weight, such as about 0.2 to about 25 percent by weight, desirably about 0.5 to about 10 percent by weight.

The composition may further include a dispersant component.

When a dispersant is present, it may be selected from sulfonated naphthalene-formaldehyde condensate salts, alkoxylated alcohol phosphates or phosphonates, acrylic acid salts, styrene sulfonic acid salts, acrylimidoalkyl sulfonic acid salts, xylene sulfonic acid salts or cumene sulfonic acid salts.

The dispersant should be present in an amount of about 1 to about 30 percent by weight, such as about 2 to about 20 percent by weight, desirably about 5 to about 10 percent by weight.

Of course, the composition may include water, which when present is in an amount up-to about 50 percent by weight, such as about up to about 25 percent by weight.

The composition may further include a photo-initiator component, such as an α-hydroxyketone, a phenylglyoxylate, a benzyl dimethyl ketal, a mono acyl phosphine oxide, a bis acyl phosphine oxide, and mixtures thereof.

The composition in another aspect should include: (a) A combination of alkylene glycol ethers comprising dipropylene glycol methyl ether and tripropylene glycol methyl ether; (b) One of more alkoxylated alcohols (such as hexanol ethoxylate); (c) One or more alkoxylated aromatic alcohols comprising benzyl alcohol ethoxylate; and (d) An antioxidant component comprising propyl gallate.

The composition may have the alkoxylated aromatic alcohols (such as benzyl alcohol ethoxylate) and/or the alkoxylated alcohol (such as hexanol ethoxylate) present in a by weight ratio of about 1:2 to about 1:10.

The composition may have the alkylene glycol ethers (such as dipropylene glycol methyl ether and tripropylene glycol methyl ether) present in a by weight ratio of about 2:1 to about 20:1.

The composition may have the alkylene glycol ether and the alkoxylated aromatic alcohol present in a by weight ratio of about 8:1 to about 2:1.

The composition may have the alkylene glycol ethers (such as dipropylene glycol methyl ether) and the alkylene glycols (such as propylene glycol) present in a by weight ratio of about 1:1 to about 1:3.

As the composition for washing the 3D printed part ages with use and over time, resin concentration increases. As a result, the 3D printed parts may have a tendency to become tacky after cure. In practice, when this is observed the composition needs to be replaced, and a proper cleaning of the container performed. However, with the addition of photoinitiator to the composition, the residual resin from the 3D printed parts that accumulates in the composition may be cured and thus "precipitate" it from the composition thereby extending the useful life of the composition. And the surface cure of the 3D printed parts, particularly those made using these LED type energy emitting devices, may be improved.

Desirable compositions useful as a cleaner to wash 3D printed parts made by additive manufacturing should include:

Sample No. 1
  Dipropylene glycol methyl ether, 74.62 wt %
  Tripropylene glycol methyl ether, 25.23 wt %
  2,6-di-tert-butyl-4-methyl phenol, 0.10 wt %
Sample No. 2
  Dipropylene glycol methyl ether, 74.62 wt %
  Tripropylene glycol methyl ether, 25.23 wt %
  Propyl gallate, 0.10 wt %
Sample No. 3
  Dipropylene glycol methyl ether, 64.94 wt %
  Hexanol ethoxylate, 19.98 wt %
  Benzyl alcohol ethoxylate, 14.98 wt %
  Propyl gallate, 0.10 wt %
Sample No. 4
  Tripropylene glycol methyl ether, 88.85 wt %
  Benzyl alcohol ethoxylate, 11.00 wt %
  Propyl gallate, 0.15 wt %

Of these four samples, Sample No. 3 is particularly desirable, as it may be used with fewer processing steps than Sample Nos. 1, 2 and 4.

The photocurable resin used to form the 3D printed part from an additive manufacturing technique should cure through exposure to radiation in the electromagnetic spectrum, such as IR, VIS, UV and UV/VIS.

Indeed, radiation at one portion of the electromagnetic spectrum may be used initially, followed by radiation in another portion of the electromagnetic spectrum. Or, radiation in the electromagnetic spectrum may be used together with exposure to elevated temperature conditions. The elevated temperature should be chosen with an eye toward the cure temperature of the resin used and its cure profile with the cure package selected. The elevated temperature condition is chosen to either (1) drive further the reaction initiated by exposure to radiation in the electromagnetic spectrum toward completion or (2) in some cases, initiate a secondary cure reaction in the 3D print resin. Where an elevated temperature condition is chosen to advance cure of the resin, the temperature chosen should be greater than room temperature plus about 70° C., though desirably less than about 180° C.

Depending on the chemistry of the 3D print resin, the cure package may vary widely in both nature and amount. For instance, where the 3D print resin is curable through (meth) acrylate functionality, the cure package may be chosen to be one triggered by exposure to radiation in the electromagnetic spectrum or elevated temperature conditions, or both.

It may be desirable in some instances to provide onto at least a portion of a surface of a build substrate a release coating material to facilitate removal of the 3D printed part once formed from the build substrate.

The release coating material may be present at a concentration in the liquid carrier in an amount of about 0.05 to about 10 percent by weight, such as about 2.5 to about 5 percent by weight.

The chosen release coating material should have a contact angle measurement of greater than 75° but less than 108°.

The 3D printed part is made according to data indicating a pattern pre-determined by software code.

As noted above, the inventive method of washing a 3D printed part made by additive manufacturing, may include the steps of:
  (a) Contacting with the inventive composition an additive manufacturing-made 3D printed part, which 3D printed part was made from a photocurable resin composition, and having at least one surface; and
  (b) Permitting the 3D printed part to remain in contact with the composition for a time sufficient to remove substantially all of any photocurable resin composition remaining on said surface; and
  (c) Removing the 3D printed part in step (b) from contact with the composition, and optionally, contacting the 3D printed part with water and/or air for a time sufficient to remove substantially all of any composition and/or water, respectively, remaining on the 3D printed part.

After step (b) but before step (c), a rinsing step may be used, where the rinse may either be an aqueous or a non-aqueous liquid. In the event that a non-aqueous liquid is used as the rinse, an aqueous rinse should then follow. Sample Nos. 1, 2 and 4 are particularly well suited for use with the rinsing step, such as with a non-aqueous rinse. After the rinse, the 3D printed part may be dried.

Alternatively, the inventive method of washing a 3D printed part made by additive manufacturing, may include the steps of:
  (a) Contacting with the inventive composition an additive manufacturing-made 3D printed part, which 3D printed part was made from a photocurable resin composition, and having at least one surface for a time sufficient to remove substantially all of any photocurable resin composition remaining on said surface; and
  (b) Contacting the 3D printed part with a non-aqueous rinse liquid; and
  (c) Removing the 3D printed part in step (b) from contact with the composition, and optionally, contacting the 3D printed part with water and/or air for a time sufficient to remove substantially all of any composition and/or water, respectively, remaining on the 3D printed part.

After step (c), the 3D printed part may be dried with air.

The time during which the various steps occur may range from about 2 minutes to about 60 minutes, such as about 2 minutes to about 10 minutes, desirably about 5 minutes to about 10 minutes.

The temperature at which the various steps occur may range from about 15° C. to about 60° C., such as about 20° C. to about 55° C., desirably about 25° C. to about 45° C.

The following examples are illustrative.

EXAMPLES

In the examples, either a Form 2 Printer was used to print parts with Formlabs Clear Resin or Formlabs Tough Resin, which are each promoted as photopolymer resins having a combination of (meth)acrylated oligomers, (meth)acrylated monomers, acrylated monomers, and a photoinitiator, or a LOCTITE PR-10 Printer was used with LOCTITE 3D 3840 Black resin.

The Form 2 Printer or the LOCTITE PR-10 Printer was set at a print resolution of 0.1 mm, which is the thickness of each layer of the print. The print takes about 2-4 hours to complete at this setting. The printed part in each case is a three dimensional rectangle that is 1"×2"×0.125" in size.

The following resins were used to make 3D printed parts on the Form 2 Printer: Formlabs Clear Resin (No. FLGPCL04) and Formlabs Tough Resin (No. FLTOTL05). LOCTITE 3D 3840 Black resin was used to make 3D printed parts in the LOCTITE PR-10 Printer.

The samples below were used as a cleaner to wash the 3D printed parts, in the manner described. Samples A and B represent state of the art washing liquids used to clean 3D printed parts.

Sample A
  Isopropanol, 99 wt %
Sample B
  Decafluoropentane, 97.4 wt %
  Reagent alcohol (combination of ethanol, isopropanol and methanol), 2.6 wt %

Sample Nos. 1-4 were used to wash 3D printed parts, in the manner described.

Sample No. 1
  Dipropylene glycol methyl ether, 74.62 wt %
  Tripropylene glycol methyl ether, 25.23 wt %
  2,6-di-tert-butyl-4-methyl phenol, 0.10 wt %
Sample No. 2
  Dipropylene glycol methyl ether, 74.62 wt %
  Tripropylene glycol methyl ether, 25.23 wt %
  Propyl gallate, 0.10 wt %
Sample No. 3
  Dipropylene glycol methyl ether, 64.94 wt %
  Hexanol ethoxylate, 19.98 wt %
  Benzyl alcohol ethoxylate, 14.98 wt %
  Propyl gallate, 0.10 wt %
Sample No. 4
  Tripropylene glycol methyl ether, 88.85 wt %
  Benzyl alcohol ethoxylate, 11.00 wt %
  Propyl gallate, 0.15 wt %

Each of Sample Nos. 1-4 contain an anti-oxidant. Sample No. 3 includes an alkylene glycol ether; an alkoxylated alcohol; an alkoxylated aromatic alcohols; and an antioxidant component.

Figure 1:
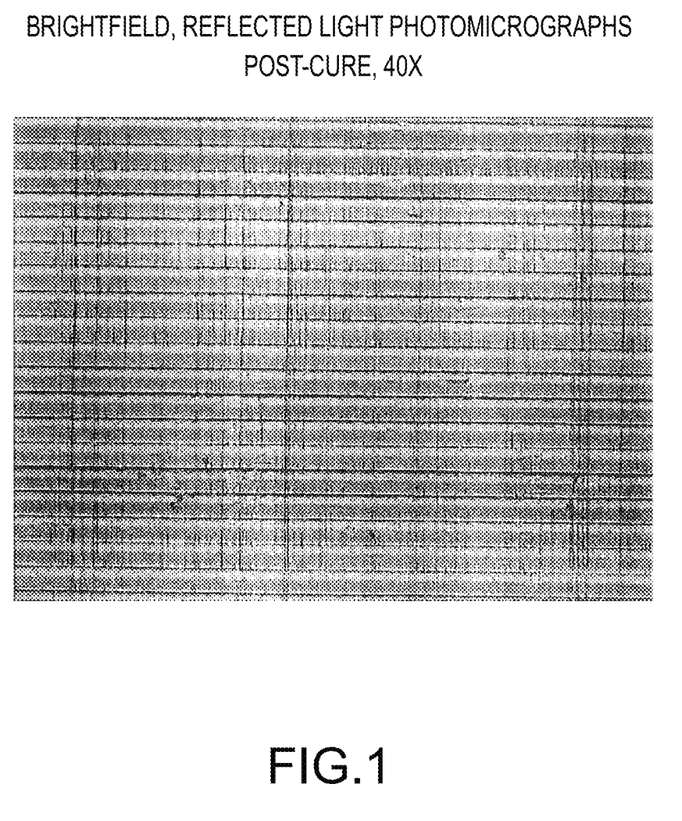
FIG. 1 depicts a digital photograph of a cleaned 3D printed part washed with Sample No. 1 with reflected light microscopy. The optical clarity of the scan lines and the overall image quality varies depending on sample content. Some normally observed small particulates can be absent or present depending upon bath age. No noticeable monomer/oligomer outcroppings are observed to be present which indicates a cleaned surface.
Figure 2:
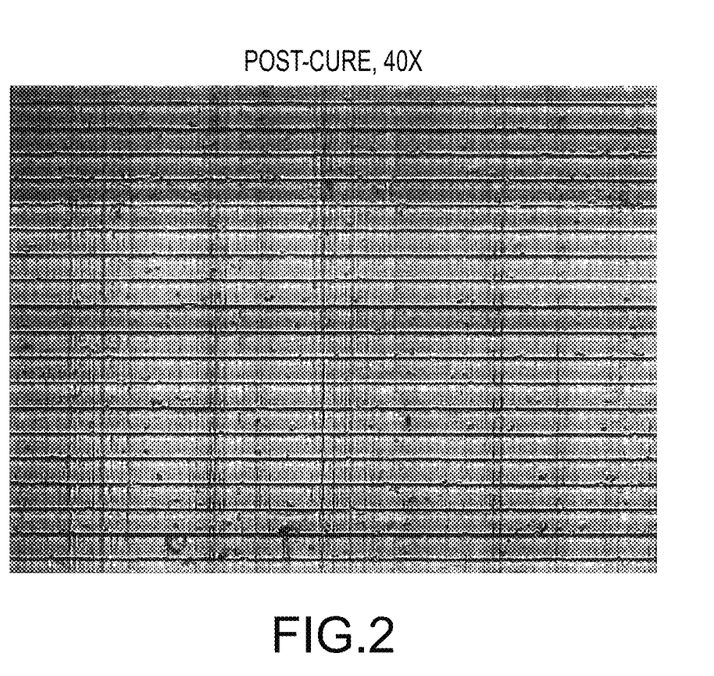
FIG. 2 depicts a digital photograph of a cleaned 3D printed part washed with Sample No. 2 with reflected light microscopy. The optical clarity of the scan lines and the overall image quality varies depending on sample content. Some normally observed small particulates can be absent or present depending upon bath age. No noticeable monomer/oligomer outcroppings are observed to be present which indicates a cleaned surface.
Figure 3:
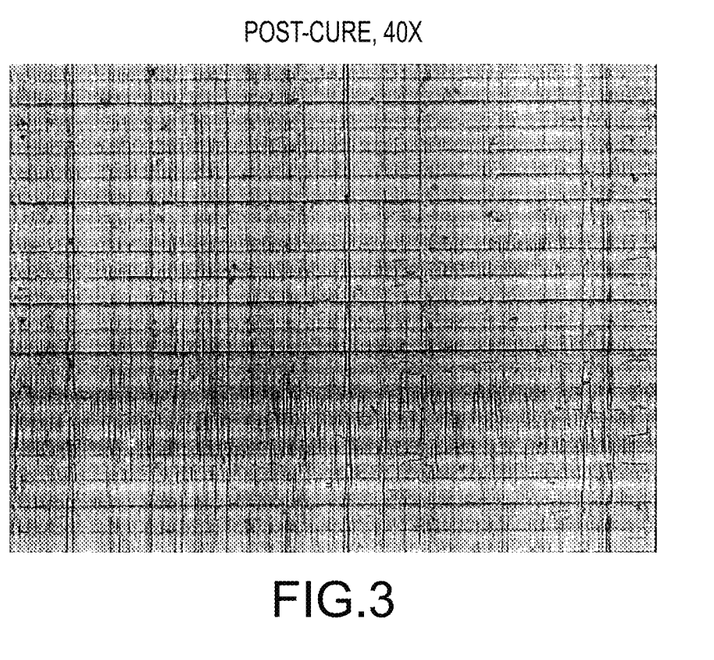
FIG. 3 depicts a digital photograph of a cleaned 3D printed part washed with Sample No. 3 with reflected light microscopy. The optical clarity of the scan lines and the overall image quality varies depending on sample content. Some normally observed small particulates can be absent or present depending upon bath age. No noticeable monomer/oligomer outcroppings are observed to be present which indicates a cleaned surface.
Figure 4:
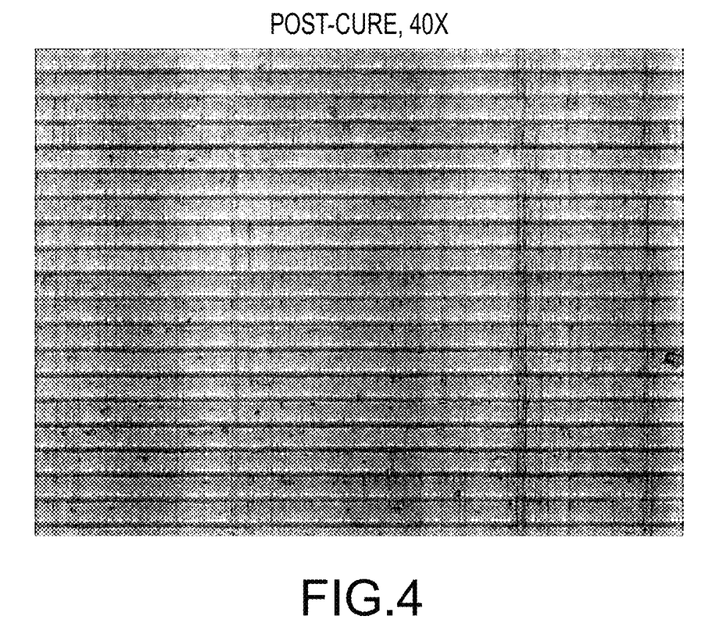
FIG. 4 depicts a digital photograph of a cleaned 3D printed part washed with Sample No. 4 with reflected light microscopy. The optical clarity of the scan lines and the overall image quality varies depending on sample content. Some normally observed small particulates can be absent or present depending upon bath age. No noticeable monomer/oligomer outcroppings are observed to be present which indicates a cleaned surface.
Figure 5:
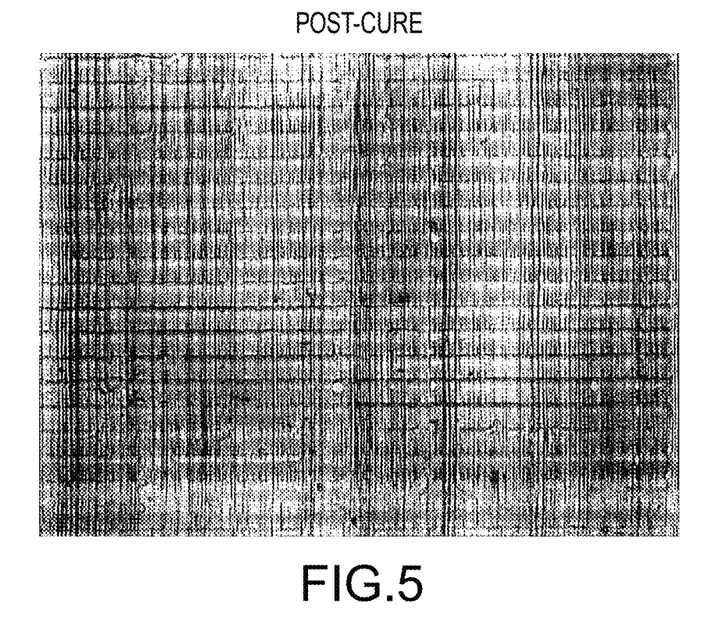
FIG. 5 depicts a digital photograph of a cleaned 3D printed part washed with Sample No. A with reflected light microscopy. The optical clarity of the scan lines and the overall image quality varies depending on sample content. Some normally observed small particulates can be absent or present depending upon bath age. No noticeable monomer/oligomer outcroppings are observed to be present which indicates a cleaned surface.
Figure 6:
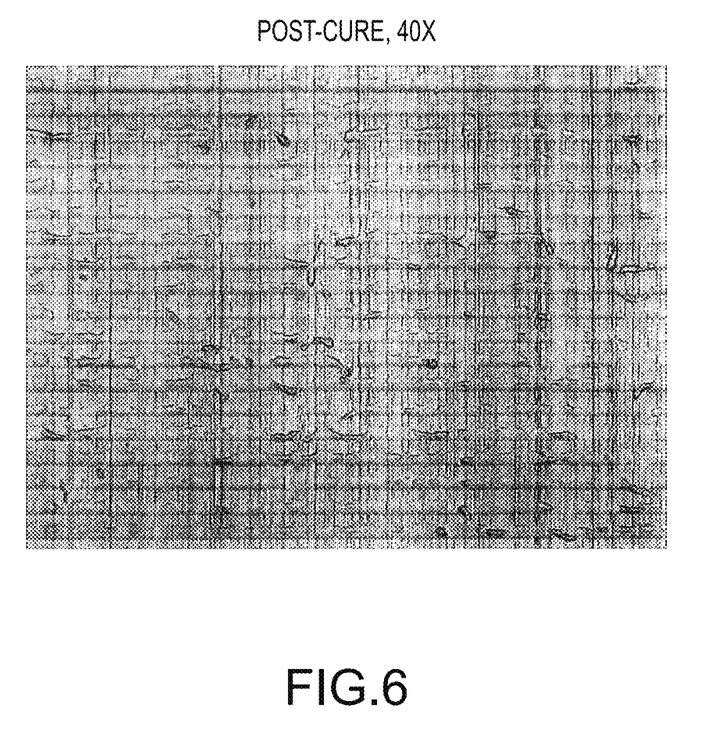
FIG. 6 depicts a digital photograph of a cleaned 3D printed part washed with Sample No. B with reflected light microscopy. The optical clarity of the scan lines and the overall image quality varies depending on sample content. Inadequate cleaning is observed by the presence of sagging outcroppings of monomers/oligomers on the part surface.

3D printed parts made as described above were washed with each of Samples A and B and Sample Nos. 1-4. For Samples A and B, the cleaning of the 3D printed parts occurred at 25° C. for a period of time of about 10-20 minutes, such as about 12.5 minutes. The appearance of the cleaned 3D printed parts using the state of the art wash liquids may be described for Sample A as non-tacky and matte finish, whereas for Sample B as having a tacky surface finish. Sample A however has a low flash point (i.e., 11.7° C.) and releases VOCs to the environment. FIGS. 5-6 reflect the performance of Samples A-B, respectively.

For Sample Nos. 1-4, the cleaning of the 3D printed parts occurred at 25° C. for a period of time of less than about 10 minutes, such as about 7.5 minutes or even about 5 minutes. The appearance of the cleaned 3D printed parts using any of Sample Nos. 1-4 may be described as non-tacky and matte finish. And the flash points of Sample Nos. 1-4, and their constituents, was at least 75° C. and in some instances greater than 94° C. FIGS. 1-4 reflect the performance of Sample Nos. 1-4, respectively.

What is claimed is:

1. A composition comprising:
   (a) One or more alkylene glycols;
   (b) One or more alkylene glycol ethers;
   (c) One or more alkoxylated aromatic alcohols; and
   (d) An antioxidant component; and
   a photo-initiator component selected from an α-hydroxyketone, a phenylglyoxylate, a benzyl dimethyl ketal, a mono acyl phosphine oxide, a bis acyl phosphine oxide, and mixtures thereof.

2. The composition of claim 1, further comprising (e) a surfactant component.

3. The composition of claim 1, further comprising (f) water.

4. The composition of claim 1, wherein the alkylene glycol(s) (a) has(have) from 1 to about 12 carbon atoms.

5. The composition of claim 1, wherein the alkylene glycol ether(s) (b) has(have) from 1 to about 10 alkyl carbon atoms forming the ether.

6. The composition of claim 1, wherein the alkylene glycol ethers (b) are ethylene glycol C1-C10 alkyl ethers or propylene glycol C1-C10 alkyl ethers.

7. The composition of claim 1, wherein the alkoxylated aromatic alcohol(s) (c) is(are) alkoxylated benzyl alcohols.

8. The composition of claim 1, wherein the antioxidant component (d) is selected from 2,6-di-tert-butyl-4-methylphenol, 2,6-di-tert-butyl-4-methoxyphenol, C1-C12 gallic acid esters, tert-butylhydroquinone, N,N-diethylhydroxylamine, ascorbic acid and its esters, and mixtures thereof.

9. The composition of claim 1, wherein the alkylene glycol(s) (a) is(are) present in an amount of about 10 to about 90 percent by weight.

10. The composition of claim 1, wherein the alkylene glycol(s) (a) is(are) present in an amount of about 50 to about 75 percent by weight.

11. The composition of claim 1, wherein the alkylene glycol ether(s) (b) is(are) present in an amount of about 10 to about 90 percent by weight.

12. A composition comprising:
   (a) One or more alkylene glycols;
   (b) One or more alkylene glycol ethers;
   (c) One or more alkoxylated aromatic alcohols; and
   (d) An antioxidant component
   wherein the alkylene glycol ether(s) (b) is(are) present in an amount of about 50 to about 75 percent by weight.

13. The composition of claim 1, wherein the alkoxylated aromatic alcohol(s) (c) is(are) present in an amount of about 1 to about 25 percent by weight.

14. The composition of claim 1, wherein the alkoxylated aromatic alcohol(s) (c) is(are) present in an amount of about 5 to about 20 percent by weight.

15. The composition of claim 2, wherein the surfactant component (e) is selected from dialkyl sulfosuccinate salts; or C4-C18 linear or branched, saturated or unsaturated alcohol alkoxylates.

16. The composition of claim 2, wherein the surfactant component (e) is selected from C4-C18 linear or branched, saturated or unsaturated alcohol ethoxylates, propoxylates, propoxylated-ethoxylates, ethoxylated-propoxylates and mixtures thereof.

17. The composition of claim 2, wherein the surfactant component (e) is present in an amount of about 5 to about 35 percent by weight.

18. The composition of claim 3, further comprising a dispersant component.

19. The composition of claim 18, wherein the dispersant component is selected from sulfonated naphthalene-formaldehyde condensate salts, alkoxylated alcohol phosphates or phosphonates, acrylic acid salts, styrene sulfonic acid salts, acrylimidoalkyl sulfonic acid salts, xylene sulfonic acid salts or cumene sulfonic acid salts.

20. The composition of claim 1, wherein the antioxidant (d) is present in an amount of about 0.005 to about 0.5 percent by weight.

21. The composition of claim 12, further comprising a photo-initiator component.

22. The composition of claim 21, wherein the photo-initiator component (g) is selected from an α-hydroxyketone, a phenylglyoxylate, a benzyl dimethyl ketal, a mono acyl phosphine oxide, a bis acyl phosphine oxide, and mixtures thereof.

23. A method of washing a 3D printed part made by additive manufacturing, comprising the steps of:
   (a) Contacting with a composition according to claim 1 an additive manufacturing-made 3D printed part, said 3D printed part made from a photocurable resin composition, and having at least one surface; and
   (b) Permitting said 3D printed part to remain in contact with said composition for a time sufficient to remove substantially all of any photocurable resin composition remaining on said surface; and
   (c) Removing said 3D printed part in step (b) from contact with said composition, and optionally, contacting said 3D printed part with water and/or air for a time sufficient to remove substantially all of any composition and/or water, respectively, remaining on said 3D printed part.

24. A method of washing a 3D printed part made by additive manufacturing, comprising the steps of:
   (a) Contacting with a composition comprising:
      (i) A combination of alkylene glycol ethers comprising dipropylene glycol methyl ether and tripropylene glycol methyl ether;
      (ii) One or more alkoxylated aromatic alcohols comprising benzyl alcohol ethoxylate; and
      (iii) An antioxidant component comprising propyl gallate, an additive manufacturing-made 3D printed part, said 3D printed part made from a photocurable resin composition, and having at least one surface; and
   (b) Contacting said 3D printed part with a non-aqueous rinse liquid; and
   (c) Removing said 3D printed part in step (b) from contact with said composition, and optionally, contacting said 3D printed part with water and/or air for a time sufficient to remove substantially all of any composition and/or water, respectively, remaining on said 3D printed part.

25. A composition comprising:
   (a) A combination of alkylene glycol ethers comprising dipropylene glycol methyl ether and tripropylene glycol methyl ether;
   (b) One or more alkoxylated aromatic alcohols comprising benzyl alcohol ethoxylate;
   (c) One or more alkoxylated alcohols comprising hexanol ethoxylate; and
   (d) An antioxidant component comprising propyl gallate.

26. The composition of claim 25, wherein the benzyl alcohol ethoxylate and hexanol ethoxylate are present in a by weight ratio of about 1:2 to about 1:3.

27. The composition of claim 25, wherein the dipropylene glycol methyl ether and tripropylene glycol methyl ether are present in a by weight ratio of about 3:1.

28. The composition of claim 1, wherein the alkylene glycol ethers and alkoxylated aromatic alcohol are present in a by weight ratio of about 8:1 to about 2:1.

29. The composition of claim 1, wherein:
   (a) the one or more alkylene glycols comprise propylene glycol; and
   (b) the one or more alkylene glycol ethers comprise dipropylene glycol methyl ether.

30. The composition of claim 29, wherein the alkylene glycols and the alkylene glycol ethers are present in a by weight ratio of about 1:1 to about 1:3; and the antioxidant component comprises propyl gallate.

31. The composition of claim 29, wherein the alkylene glycols are present in an amount of about 50 to about 90 percent by weight.

32. The composition of claim 29, wherein the alkylene glycol ethers are present in an amount of about 10 to about 50 percent by weight.

* * * * *